United States Patent [19]
Gut

[11] Patent Number: 6,101,217
[45] Date of Patent: Aug. 8, 2000

[54] SYSTEM AND METHOD FOR DEMODULATING DIGITAL INFORMATION FROM AN ODD CONSTELLATION

[75] Inventor: Richard Gut, Red Bank, N.J.

[73] Assignee: Globespan Semiconductor, Inc., Red Bank, N.J.

[21] Appl. No.: 09/075,722

[22] Filed: May 11, 1998

[51] Int. Cl.[7] ................................. H04B 1/38; H04L 5/16
[52] U.S. Cl. ........................ 375/222; 375/261; 329/304
[58] Field of Search ................................. 375/222, 232, 375/259, 261, 263, 266, 313, 340, 341, 346; 371/43.1, 43.6, 43.7; 329/304, 306

[56] References Cited

U.S. PATENT DOCUMENTS

| | | | |
|---|---|---|---|
| 4,601,044 | 7/1986 | Kromer, III et al. | 375/261 |
| 5,442,655 | 8/1995 | Dedic et al. | 375/340 |
| 5,500,875 | 3/1996 | Pope | 375/261 |
| 5,537,437 | 7/1996 | Kaku et al. | 375/231 |
| 5,774,504 | 6/1998 | Huszar et al. | 375/341 |
| 5,832,044 | 11/1998 | Sousa et al. | 375/347 |
| 5,974,090 | 10/1999 | Hirao et al. | 375/261 |
| 5,995,551 | 11/1999 | McCallister et al. | 375/265 |
| 6,026,120 | 2/2000 | Betts | 375/261 |

*Primary Examiner*—Chi H. Pham
*Assistant Examiner*—Bryan Webster
*Attorney, Agent, or Firm*—Thomas, Kayden, Horstemeyer & Risley

[57] ABSTRACT

A system and method for demodulating digital information from a modulated signal that can be represented in a signal space diagram as an odd constellation of sample points. The system comprises filtering means for receiving the modulated signal that includes means for rotating the received sample points 45° clockwise on the signal space diagram such that decision or neighborhood regions can be drawn having borders that are either parallel or perpendicular to the axes of the signal space diagram. As a result, a slicer can easily extract the symbol information from the rotated sample points with a minimum of computational complexity. Moreover, and perhaps most importantly, the rotation is accomplished through a one time modification of the tap coefficients used by the filtering means thus eliminating any additional processor real time required to perform the rotation. Indeed, through this modification of the filtering means, the present invention can be used to effectively and efficiently demodulate odd constellations without any dependence on the baud rate.

19 Claims, 11 Drawing Sheets

SYSTEM AND METHOD FOR DEMODULATING DIGITAL INFORMATION FROM AN ODD CONSTELLATION

BACKGROUND OF THE INVENTION

The present invention relates generally to the field of demodulation and detection of analog signals carrying digital data, and more particularly to demodulation of an analog signal that is modulated by an odd constellation of signal sample points.

To transmit digital data over the public switched telephone network (PSTN), modulation is necessary to code the digital information into analog signals. A common modulation technique used in digital communications is known as carrierless amplitude and phase (CAP) modulation. Specifically, CAP modulates the digital information into two orthogonal signal components, referred to as the in-phase component and the quadrature component. Thus, digital information can be represented in CAP by a signal comprising a combination of the in-phase and quadrature components.

The signal set representing the digital information is commonly displayed in a two dimensional, signal space or constellation diagram in which the number of points in the constellation is given by $2^n$ where n is the number of bits to be encoded. Constellations are termed even or odd based on whether n is an even or odd number. Thus, a 16 point constellation is considered an even constellation while an 8 point constellation is considered an odd constellation. Furthermore, as used herein, a 16 point constellation is considered one constellation level higher than an 8 point constellation.

Based on the noise and attenuation characteristics of the communication channel, an optimal modulation profile can be determined. That is, the number of bits per baud and the baud rate will vary according to the transmission characteristics of the communication channel for optimum throughput. In practice, it is not uncommon for systems to be designed to alternate between 8, 16, 32, 64, 128 and 256 point constellations. Even constellations, however, enjoy a geometric benefit in demodulation because they are arranged in a "square" in which all of the individual points fall along a grid allowing a decision device to easily extract the error and recover the original digital information.

Prior art attempts to demodulate odd constellations have often involved translating the individual odd constellation points onto an even constellation decision grid where the error can be extracted and the digital information recovered using even constellation demodulation methods. While these approaches are effective in demodulating odd constellations, the translation and error extraction must be performed at the baud rate, which requires additional processor real time to perform the signal processing.

Accordingly, there exists a need for a system to demodulate odd constellations that can take advantage of the geometrical benefit inherent in even constellations, is not dependent on the baud rate and minimizes any additional processor real time required for signal processing.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for demodulating digital information from a modulated signal. Broadly stated, the present invention, in a preferred embodiment thereof, comprises an improved receiving modem having a filtering means for receiving a modulated signal that can be represented in a signal space diagram as an odd constellation of sample points. Advantageously, the filtering means includes means for rotating these received sample points 45° clockwise on the signal space diagram such that decision or neighborhood regions can be drawn having borders that are either parallel or perpendicular to the axes of the signal space diagram. As a result, a slicer can easily extract the symbol information from the rotated sample points with a minimum of computational complexity. Moreover, and perhaps most importantly, the rotation is accomplished through a one time modification of the tap coefficients used by the filtering means thus eliminating any additional processor real time required to perform the rotation.

A significant advantage of the present invention is that it can be used to effectively and efficiently demodulate odd constellations without any dependence on the baud rate. Furthermore, the filtering means can be adapted using rotated error vectors calculated by the slicer. This provides yet another performance advantage over those systems that rotate or translate odd constellation sample points in the slicer or in a separate rotation filter configured as a front end to the slicer that require unrotation of error vectors before they can be used in training or adapting the system to the noise characteristics of the communication channel.

According to the preferred embodiment, the odd constellation is generated by eliminating every other point from the next higher even constellation. The transfer function implemented by the filtering means to carry out the rotation is mathematically very simple. Specifically, the constellation points are rotated by adding their in-phase and quadrature components to create a rotated in-phase component. The rotated quadrature phase component is generated by subtracting the in-phase component from the quadrature phase component. An offset constant is commonly added to the rotated quadrature phase component to shift the rotated constellation points into decision or neighborhood regions that are contained within a single quadrant of the signal space or constellation diagram. The rotated components are frequently scaled to maintain a consistent neighborhood size with the non-rotated constellation. The simplicity of the rotation algorithm is advantageous in that it can be easily implemented through modification of the tap coefficients.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE INVENTION

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Figure 1:
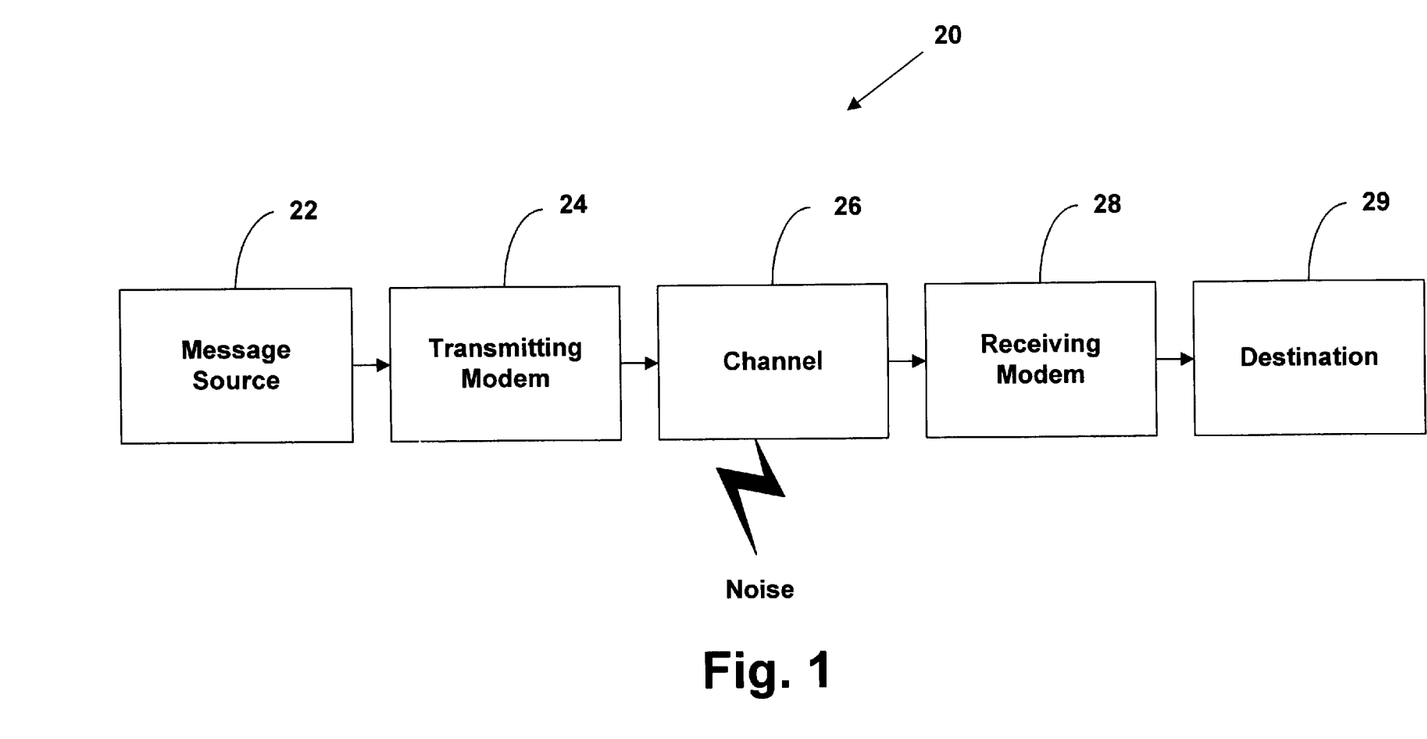
FIG. 1 is a high level block diagram of a digital communication system.

FIG. 1 shows a simplified model of a digital communication system 20. A message source 22 generates a set of information that is provided to a transmitting modem 24 for transmission across channel 26. The information provided by message source 22 is generally in digital form. Therefore, to transmit this information across a network designed to carry analog signals, such as the public switched telephone network (PSTN), transmitting modem 24 uses the information from message source 22 to modulate an analog signal in the form of symbols for transmission across channel 26 to receiving modem 28. Unfortunately, the modulated signal transmitted from transmitting modem 24 typically arrives at receiving modem 28 attenuated and corrupted by noise. Rather than attempting to reproduce the transmitted analog waveform, however, the goal of the receiving modem in a digital communication system is to determine what digital information was sent by message source 22. Receiving modem 28 accomplishes this through demodulation where an estimate of the transmitted symbol is generated and applied to a decision device. The decision device determines what digital information was sent by applying a set of decision rules to the estimated symbol. Decision rules are selected according to various criteria, such as average probability of error.

Figure 2:
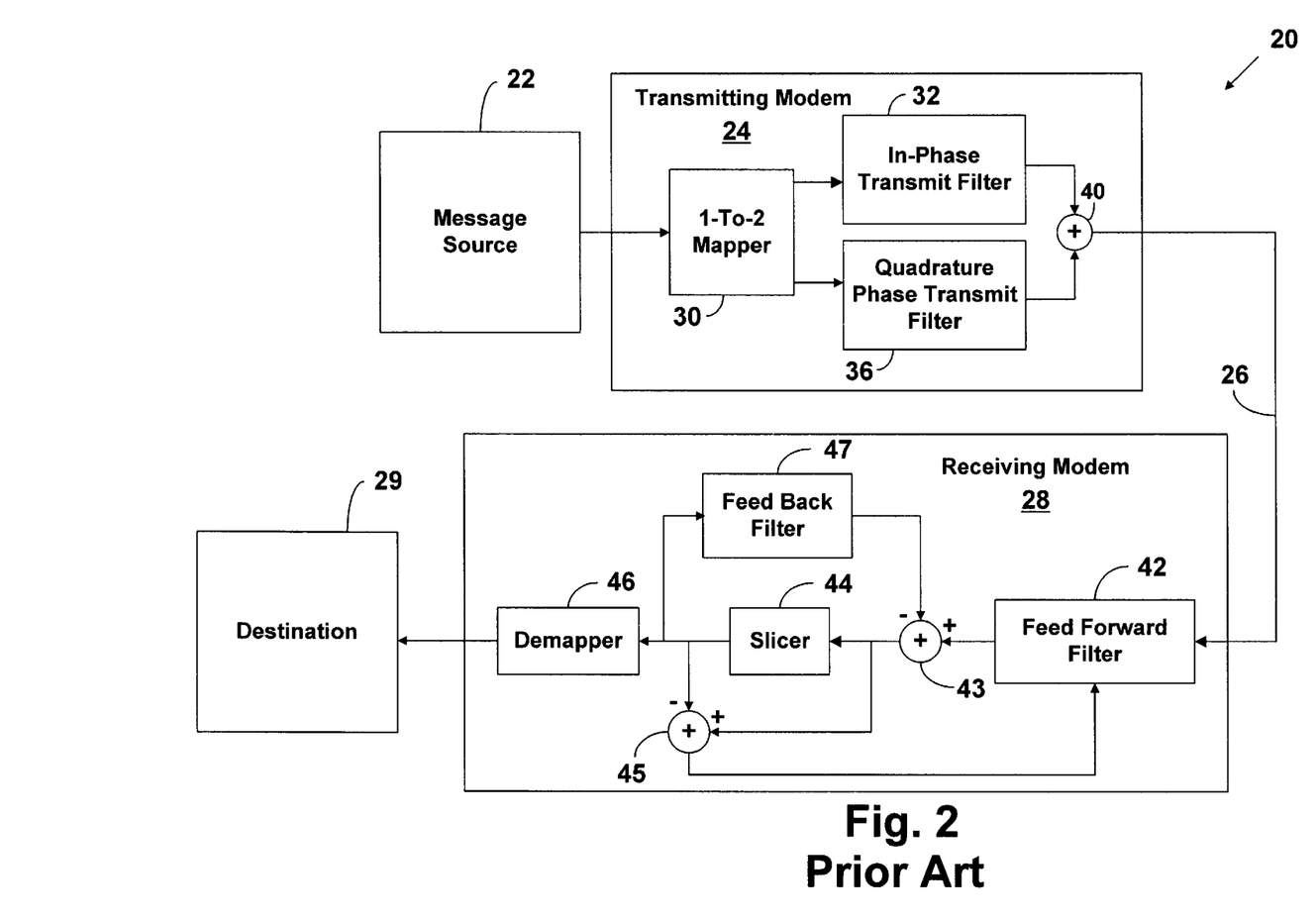
FIG. 2 is a more detailed block diagram illustrating the internal architecture of the transmitting modem and receiving modem of FIG. 1.

Referring now to FIG. 2, a more detailed illustration of a CAP digital communication system 20 is shown. Specifically, digital data from message source 22 is applied to a 1-to-2 mapper 30 that develops two outputs that are typically referred to as the in-phase and quadrature samples. The in-phase samples are applied to in-phase transmit filter 32 while the quadrature samples are applied to quadrature phase transmit filter 36. The output signals of filters 32 and 36 are added in element 40 to develop the analog signal that is transmitted across channel 26 to receiving modem 28.

The digital data applied to mapper 30 is essentially a bit stream. Mapper 30, however, parses this bit stream into a stream of symbols that each comprise a preselected number of consecutive bits. These symbols are mapped into the in-phase and quadrature samples that are then filtered through two orthogonal filters and used to create the analog signal for transmission to a receiving modem.

Figure 3:
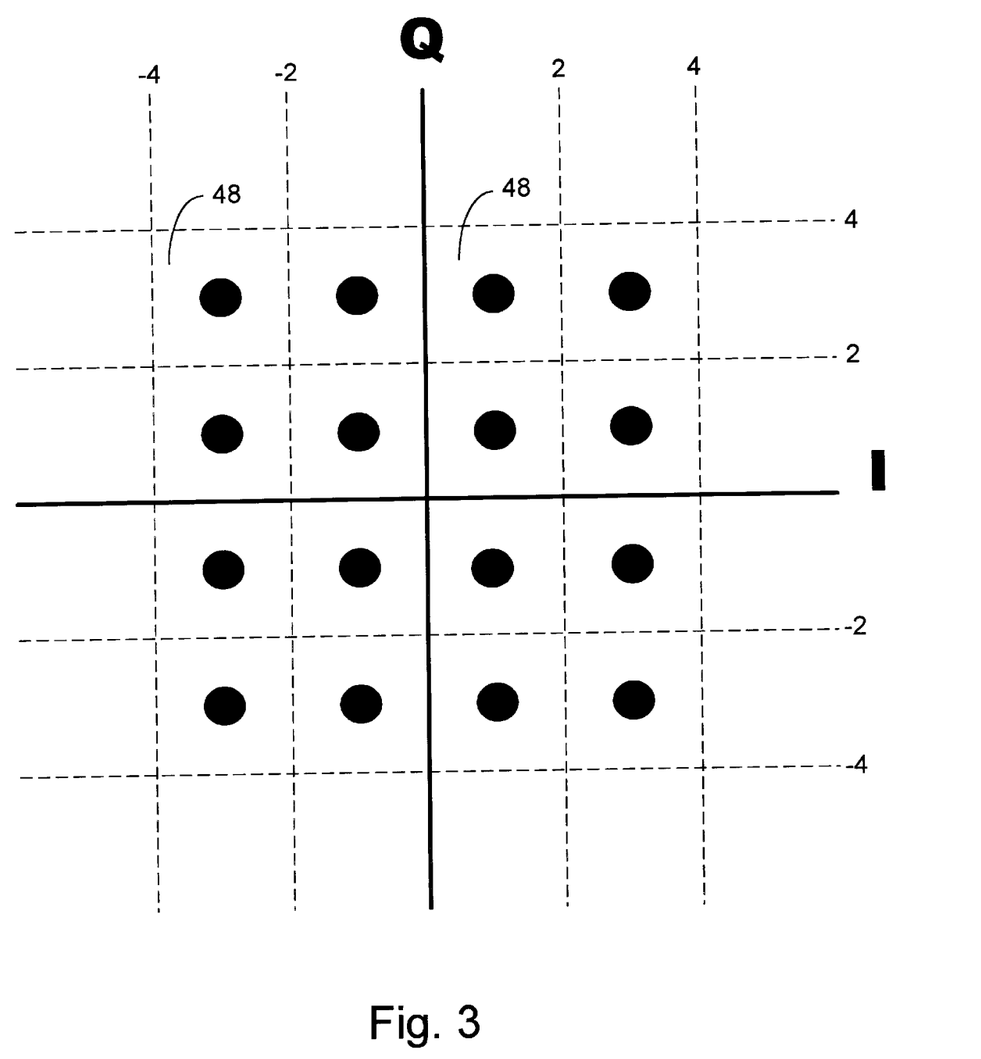
FIG. 3 is a 16 point constellation diagram for use in the digital communication system of FIG. 1.

The procedure just described with respect to transmitting modem 24 is often depicted in the form of a signal space or constellation diagram such as the example shown in FIG. 3. The horizontal or in-phase axis (I) corresponds to the in-phase transmit filter 32 and the vertical or quadrature axis (Q) corresponds to the quadrature phase transmit filter 36. Accordingly, the possible combinations of in-phase and quadrature samples generated by mapper 30 forms a constellation of points on the graph. FIG. 3 is an example of a 16 point constellation in which each point or symbol represents 4 bits of digital information.

Returning now to FIG. 2, the symbols represented in FIG. 3, for example, are transmitted across channel 26 where they are corrupted by noise and attenuation. The analog signal carrying the symbol information is received by receiving modem 28 where it is applied to feed forward filter 42. Feed forward filter 42 is a finite impulse response (FIR) digital filter commonly known in the art as an equalizer or equalization filter. The transfer function of feed forward filter 42 can generally be represented by Equation 1 set forth below:

$$Y_n = \sum_{k=1}^{k=m} C_k^n X_{n-k} \qquad (1)$$

$Y_n$ is the output at time n, $C_k^n$ is the $k^{th}$ complex coefficient at time n and $X_{n-k}$ represents a sample of a digital input signal X(t) before time n. Typically, the collection of samples $X_{n-1}$ through $X_{n-m}$ are stored in a tapped delay line. The characteristics of the filter are determined by the values of the complex coefficients at time n. Each complex coefficient is also called a tap weight or tap coefficient. The complex coefficient, $C_k^n$, multiplies the respective sample of X(t) with the result that $Y_n$ is equal to the sum of the products of the coefficients and the respective m samples of X(t). This approach of generating output samples $Y_n$ based on a weighted summation of prior-in-time input samples combats the effects of noise, attenuation and inter-symbol interference (ISI) due to delay and distortion caused by channel 26.

Because in-phase transmit filter 32 and quadrature phase transmit filter 36 are orthogonal, feed forward filter 42 can recover the in-phase and quadrature samples or components independently and then apply them to slicer 44 through adder 43. Slicer 44 converts the in-phase and quadrature components into symbols that are then applied to demapper 46 to reconstruct the original digital data bit stream for destination 29. Adder 45 computes the error vectors, which are defined as the difference between the received signal samples at slicer 44 and the valid constellation points determined by slicer 44, by which the feed forward filter coefficients are adapted to the characteristics of channel 26. Generally, the coefficients for feed forward filter 42 are initialized during a period known as the training interval. Training is the initial connection process receiving modem 28 uses to synchronize with a transmit signal from transmitting modem 24. In addition to setting the equalization coefficients for feed forward filter 42, other tasks such as gain control, receiver timing acquisition and echo cancellation convergence are also resolved during this period.

A second feedback loop is included that couples the output of slicer 44 through feed back filter 47 to adder 43.

Feed back filter 47 is an equalization filter similar to feed forward filter 42 and is used to further refine the input signal that is applied to slicer 44. Specifically, because the input signal to feed back filter 47 comes from the output of slicer 44, it is uncorrupted by noise. Therefore, feed back filter 47 is designed primarily to eliminate the effects of ISI due to the delay characteristics of channel 26.

To understand the demodulation carried out by receiving modem 28, it is helpful to refer to the constellation diagram of FIG. 3. In an ideal environment, the signal received by receiving modem 28 would correspond precisely with the constellation points shown in the diagram of FIG. 3. The noise and attenuation from channel 26, however, have the effect of shifting the received signal in the signal space resulting in a distorted input to slicer 44. For slicer 44 to accurately correlate the received in-phase and quadrature components with a valid symbol, the signal space is divided into a grid comprising a plurality of regions 48 and a decision is made according to the region in which the received signal is located. Regions 48 are frequently called neighborhood regions.

Neighborhood regions 48 should be designed such that each region will continue to encompass its assigned constellation point even when that point is shifted by a noise component. In the FIG. 3 example, neighborhood regions 48 are demarcated by signal amplitude levels running in increments of 2 along both the in-phase and quadrature axes. Clearly, noisy channels will require additional transmission power to create greater separation between the constellation points or force a lower data rate, which can be accommodated by dropping down to a smaller constellation.

Figure 4:
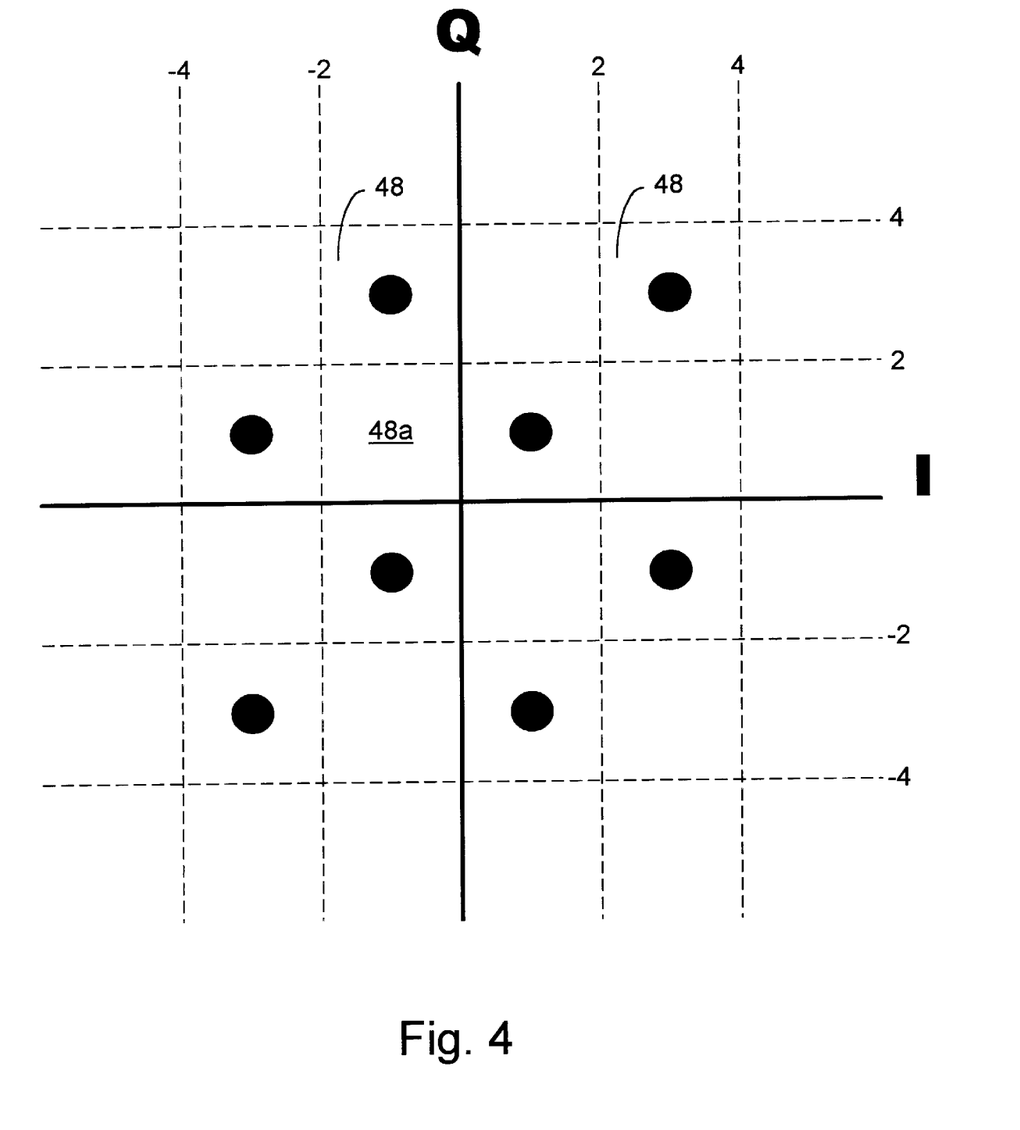
FIG. 4 is an 8 point constellation diagram constructed from the 16 point constellation diagram of FIG. 3.

While the foregoing approach is very effective for communication systems using even constellations, demodulation of odd constellations is not as straightforward. Odd constellations can be generated using a variety of techniques, but one popular method of construction is to cancel out every other point from the next higher even constellation. FIG. 4 is an example of an 8 point constellation that was constructed from the 16 point constellation of FIG. 3 using this technique. The empty neighborhood regions (e.g., 48*a*) that are created by this construction, however, present a problem for slicer 44 in correlating the received signal with a valid constellation point.

Figure 5:
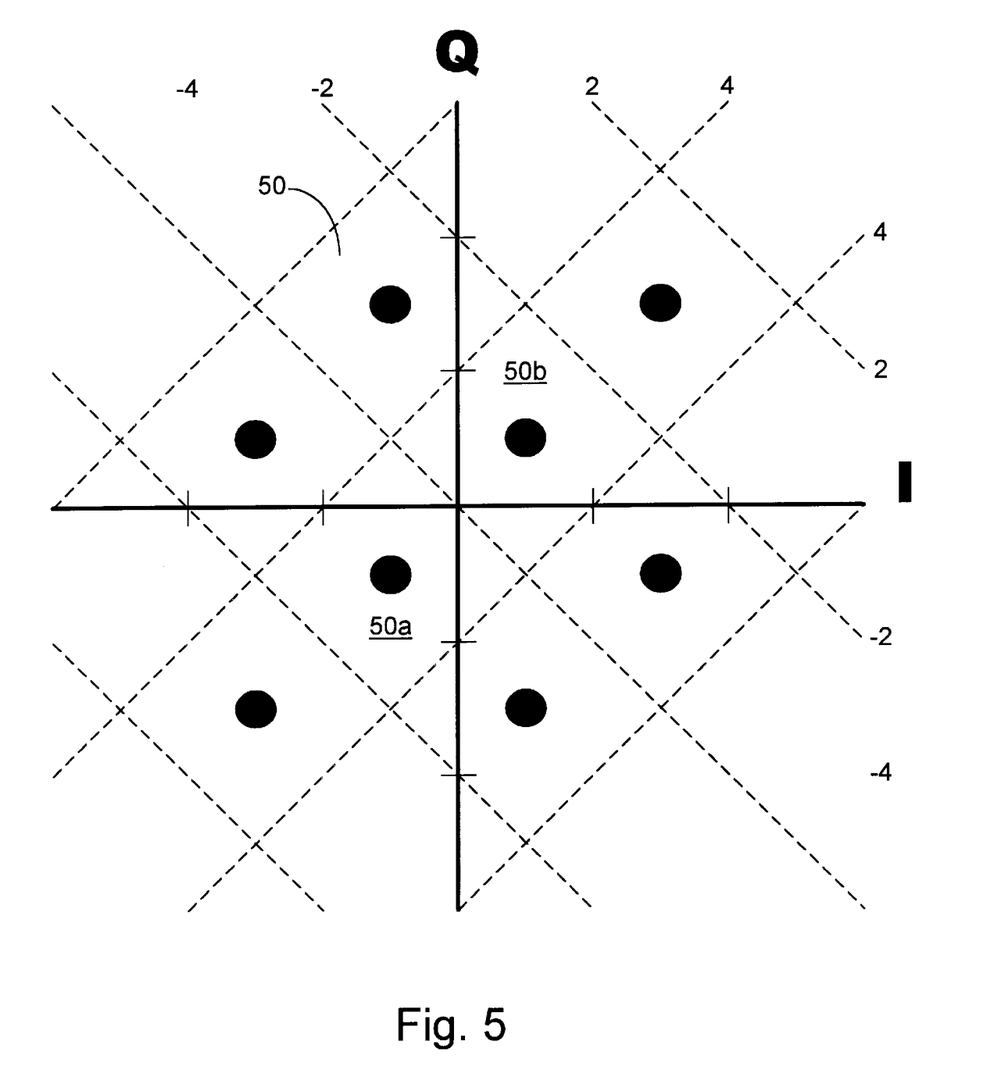
FIG. 5 depicts the new neighborhood regions constructed for the 8 point constellation diagram of FIG. 4.

Consider neighborhood region 48*a*, which is surrounded on four sides by neighborhood regions 48 containing valid constellation points. To effectively demodulate the constellation of FIG. 4, neighborhood region 48*a* must be divided and allocated amongst the bordering neighborhood regions. FIG. 5 depicts the 8 point constellation of FIG. 4 with reconstructed neighborhood regions 50. Due to the positioning of neighborhood regions 50, the task for slicer 44 becomes more complex. For example, neighborhood regions 50*a* and 50*b* span regions covering three quadrants on the constellation diagram. This stands in contrast to the grid-like layout of neighborhood regions 48 used for the 16 point constellation of FIG. 3. For the 16 point constellation, each neighborhood region 48 falls in a single quadrant and is aligned in rectangular fashion with the in-phase and quadrature axes. Slicer 44 is therefore required to maintain an elaborate decision tree and perform additional computations over what is normally required for an even constellation to extract symbol information for an odd constellation.

Figure 6:
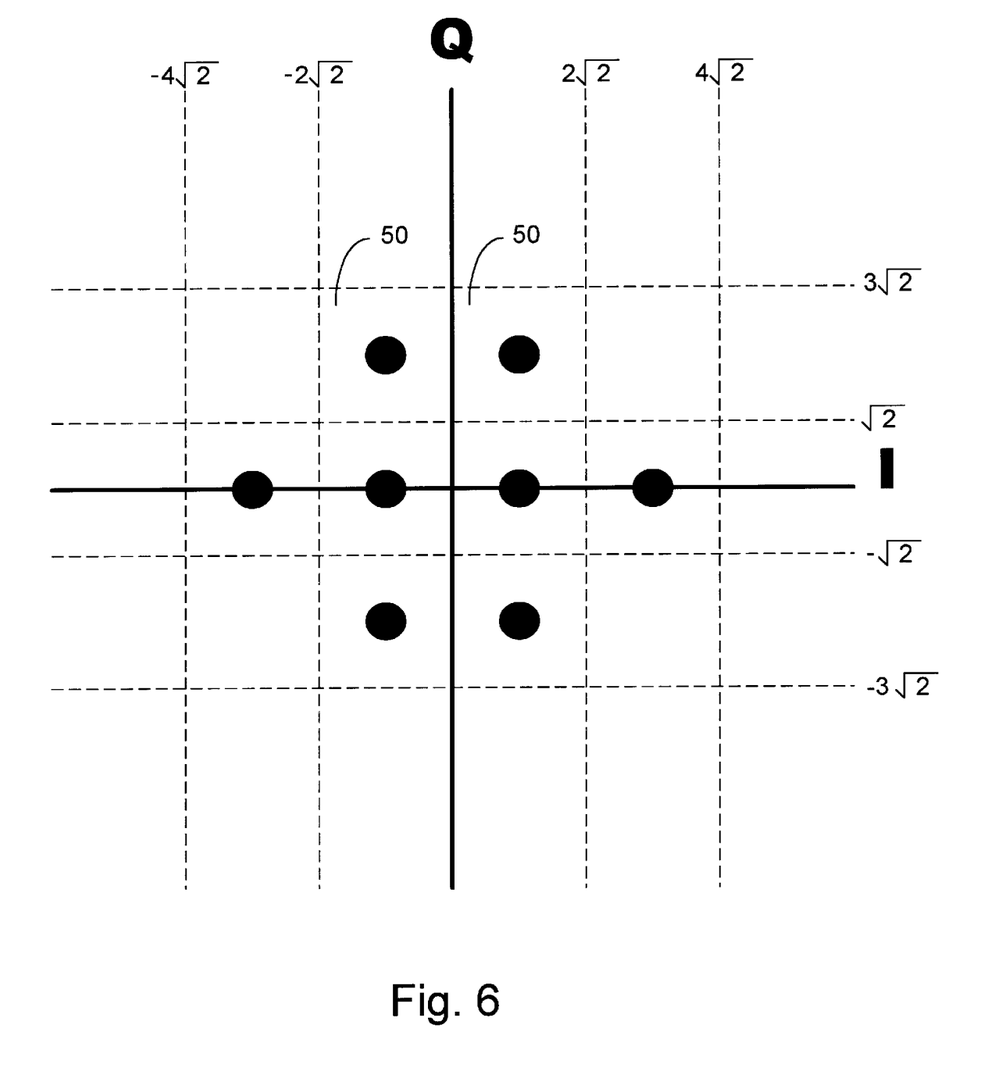
FIG. 6 is the 8 point constellation diagram of FIG. 5 rotated clockwise 45°.
Figure 7:
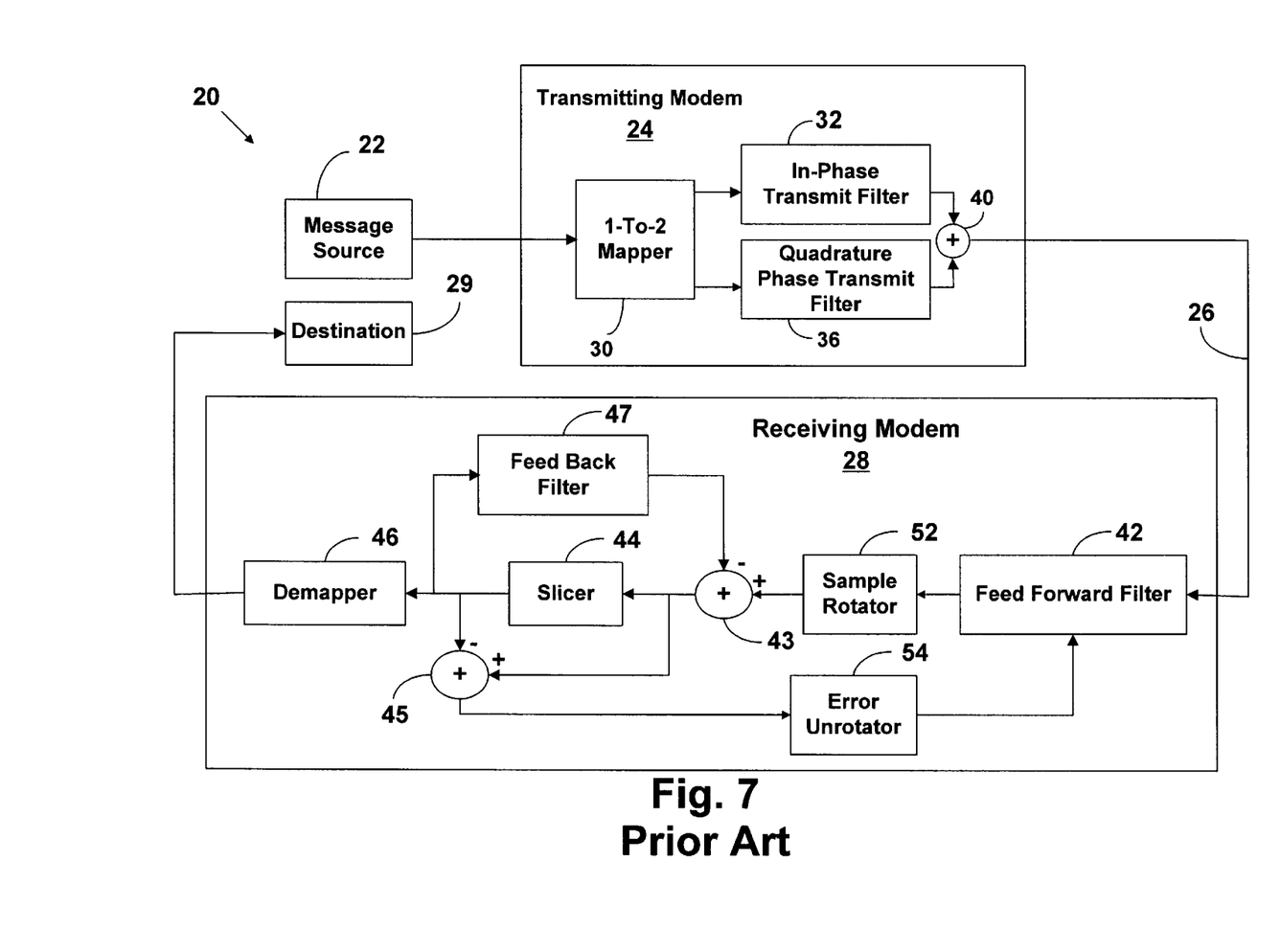
FIG. 7 is a block diagram illustrating a modified receiving modem for performing the constellation rotation of FIG. 6.

One possible solution to this penalty in demodulating odd constellations is to rotate the constellation and neighborhood regions 50 of FIG. 5 clockwise by 45°, which results in the constellation diagram depicted in FIG. 6. This can be accomplished through a modification to receiver 28 as shown in FIG. 7. Interposed between feed forward filter 42 and slicer 44 is a complex sample rotator 52, which implements the transfer function set forth in Equation 2:

$$h_{rot}[\,] = (\sqrt{2}/2)(1-j) \tag{2}$$

The transfer function of Equation 2 comprises a real portion for generating the in-phase signal component and an imaginary portion for generating the quadrature component. The rotated in-phase signal component is generated by summing the in-phase and quadrature signal components, while the rotated quadrature component is generated by taking the difference between the quadrature component and the in-phase component. Both rotated components are scaled by an appropriate factor to achieve a desired size for the resulting neighborhood regions. In the present example, a scaling factor of $\sqrt{2}/2$ is used to maintain a consistent size for neighborhood regions 50 between the unrotated version of FIG. 5 and the rotated version of FIG. 6.

As is readily apparent from FIG. 6, simply rotating the valid constellation points and neighborhood regions 50 of an odd constellation does not result in the preferred configuration in which neighborhood regions do not span quadrants. This problem is easily resolved, however, by modifying sample rotator 52 to add an offset to the quadrature component to raise the valid constellation points and neighborhood regions 50 to the configuration shown in FIG. 8 where each region is positioned within a single quadrant.

Because adder 45 will now calculate error vectors based on the difference between the rotated received signal samples and the rotated valid constellation points, an error unrotator 54 must be included to unrotate these vectors before they are fed back to feed forward filter 42 for coefficient adaptation. The transfer function of error unrotator 54 is simply the inverse of the transfer function for sample rotator 52 as set forth in Equation 3:

$$h_{error\_rot}[\,] = h^{-1}_{rot}[\,] = (\sqrt{2}/2)(1+j) \tag{3}$$

While the foregoing approach is effective in demodulating odd constellations, it nonetheless suffers from a major drawback: the signal sample rotation and the error vector rotation must be performed at the baud rate, which requires additional processor real time to implement both sample rotator 52 and error unrotator 54 that could limit overall system performance.

Figure 9:
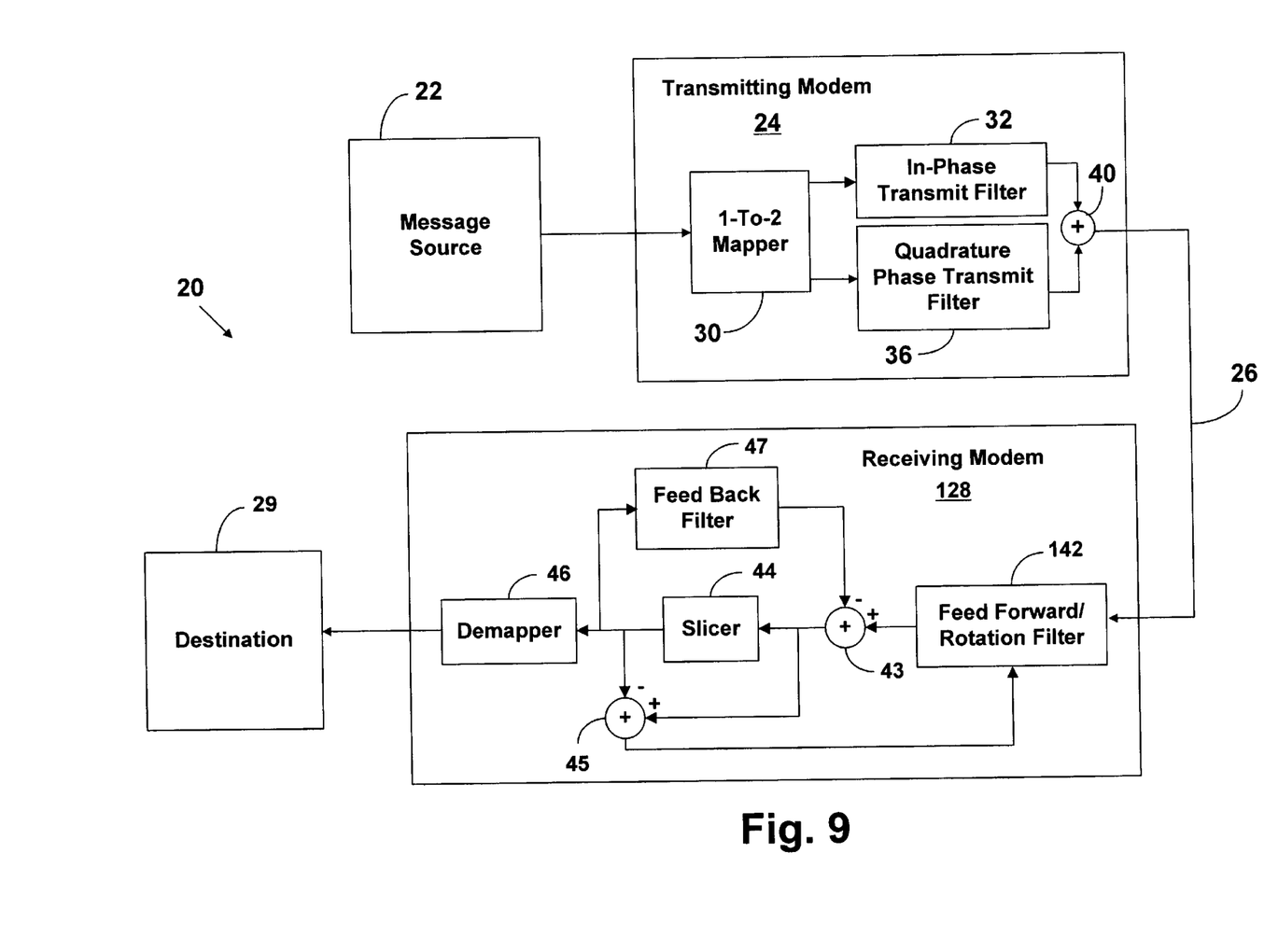
FIG. 9 is a block diagram illustrating the preferred embodiment of a receiving modem for performing the constellation rotation of FIGS. 6 and 8.

Advantageously, the present invention as depicted in the FIG. 9 embodiment provides the same constellation rotation as the FIG. 7 design, but eliminates the need for signal sample rotation and error vector unrotation at the baud rate. This is accomplished by moving the rotation defined by Equation 2 and performed by sample rotator 52 (see FIG. 7) into the feed forward filter 42 to form a feed forward/rotation filter 142. Feed forward/rotation filter 142 incorporates the transfer function set forth below as Equation 4 with its existing role of recovering the in-phase and quadrature signal samples from the analog signal.

$$h_{rot}[\,] = (\sqrt{2}/2)(h^i[\,]+h^q[\,]) + j(\sqrt{2}/2)(h^q[\,]-h^i[\,]) \tag{4}$$

Figure 8:
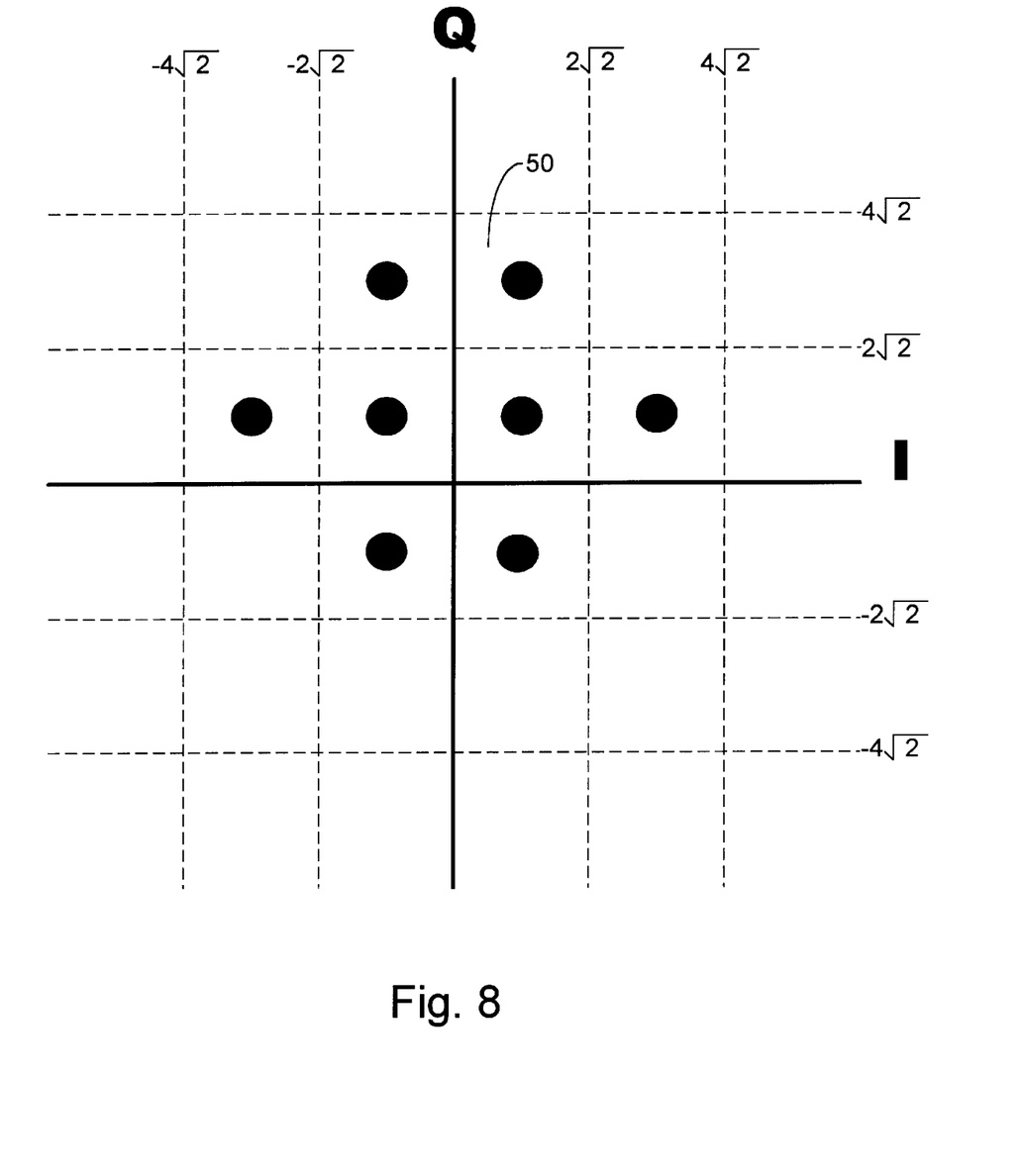
FIG. 8 is the 8 point constellation diagram of FIG. 6 with a quadrature offset applied.

In addition, feed forward/rotation filter 142 can be further modified to add an offset to the quadrature component such that the valid constellation points and neighborhood regions 50 correspond to the configuration shown in FIG. 8.

Figure 10:
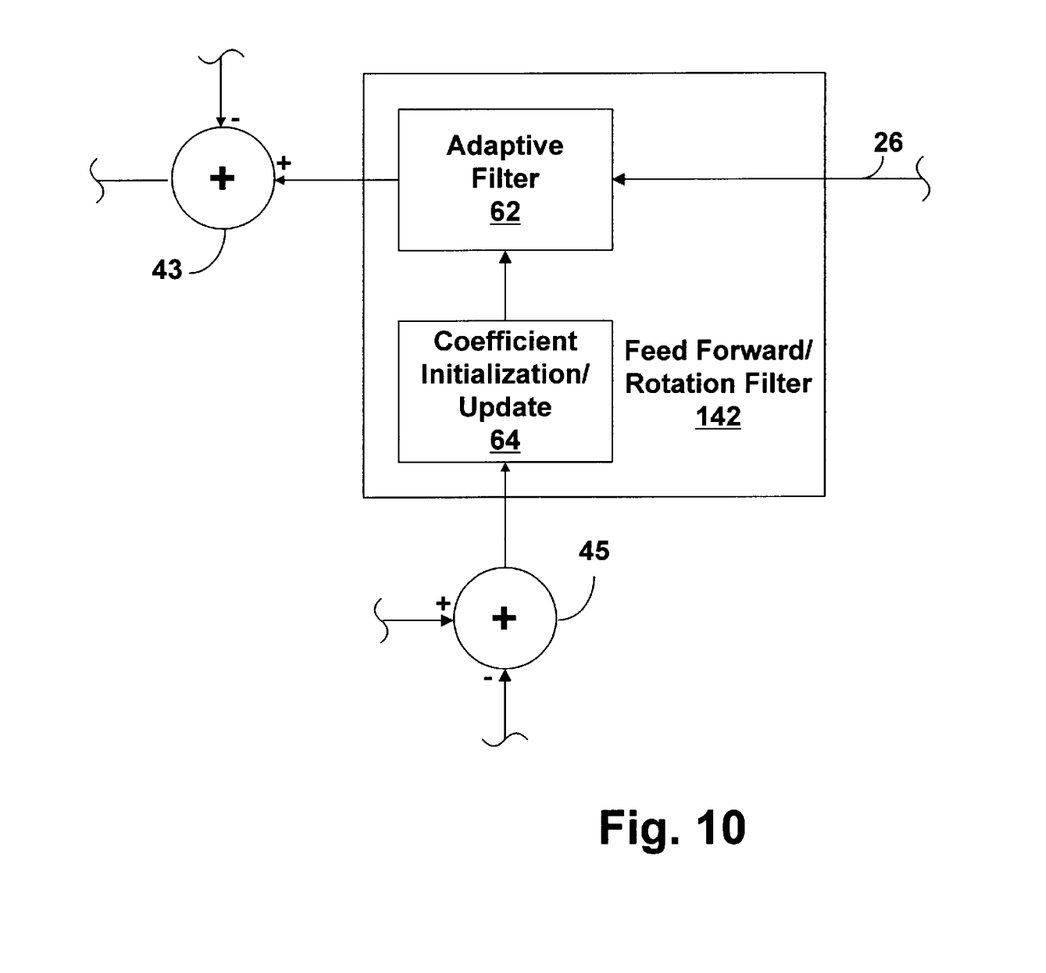
FIG. 10 is a more detailed block diagram of the feed forward/rotation filter of FIG. 9.

FIG. 10 provides a more detailed illustration of the components comprising feed forward/rotation filter 142. Feed forward/rotation filter 142 includes an adaptive filter 62 whose coefficients are adaptively updated through coefficient initialization/update block 64 based on error information fed back through adder 45 and any rotation applied for the case of odd constellation demodulation. The output from adaptive filter 62 is applied to adder 43 where it is modified to reduce the effects of ISI before being applied to slicer 44 as shown in FIG. 9.

Figure 11:
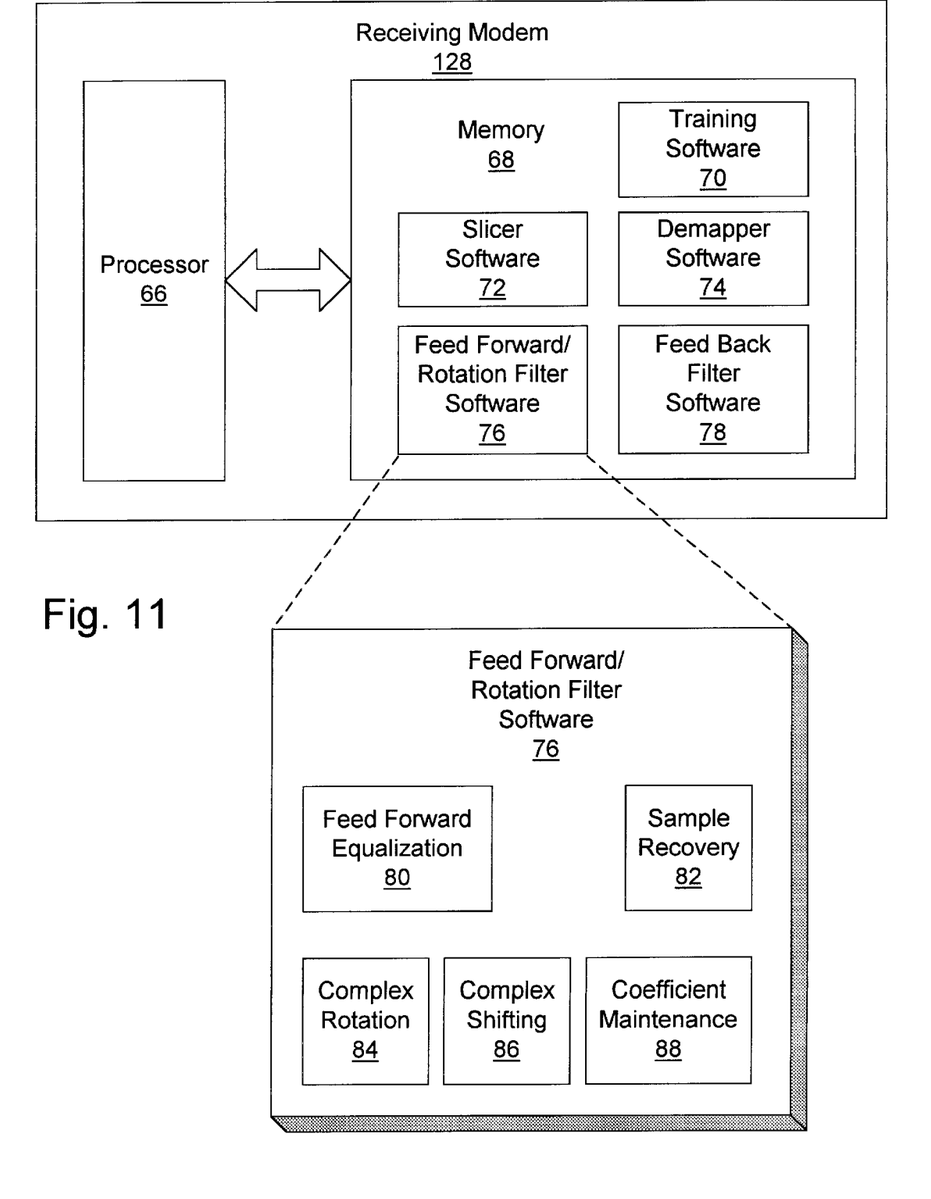
FIG. 11 is a software architecture block diagram of the receiving modem of FIG. 9 in general and the feed forward/rotation filter of FIG. 10 in particular.

The functionality of receiving modem 128 in general and feed forward/rotation filter 142 in particular is often controlled through software. FIG. 11 illustrates an exemplary software architecture for implementing receiving modem 128 and feed forward/rotation filter 142 according to the present invention. Receiving modem 128 includes a processor 66 in communication with a memory 68. Memory 68, which may adopt any suitable form (e.g., random access memory (RAM), read only memory (ROM), floppy disk, hard disk, optical disk, etc.) holds software comprising program instructions and data for the various functional sub-components. As illustrated, memory 68 holds training software 70, slicer software 72, demapper software 74, feed forward/rotation filter software 76 and feed back filter software 78. A single processor 66 and memory 68 architecture is described herein for illustration purposes only. The skilled practitioner will recognize that alternative embodiments are possible in which multiple digital processors and memory devices are used to implement the sub-components (e.g., feed forward/rotation filter 142, slicer 44, feed back filter 47 and demapper 46) individually or in groups. The operation of receiving modem 128 with an emphasis on the role of feed forward/rotation filter 142 is described hereafter.

At the end of the training interval, transmitting modem 24 and receiving modem 128 through training software 70 will agree on the type of modulation to be used during their communication session. If an odd constellation is chosen, feed forward/rotation filter 142 initializes its equalization coefficients to carry out the rotation given by Equation 3. As shown in FIG. 11, feed forward/rotation filter software 76 can be partitioned into sub-systems for feed forward equalization 80, sample recovery 82, complex sample rotation 84, complex sample shifting 86 and coefficient maintenance 88. Sample recovery software 82 through adaptive filter 62 recovers the in-phase and quadrature samples of the training signal. Under the control of feed forward equalization software 80, the samples are stored in memory 68 in the form of a tapped delay line. Feed forward equalization software 80 generates filtered versions of the recovered in-phase and quadrature samples through multiplication of the samples stored in the delay line with a set of tap coefficients according to the formula given by Equation 1. If training software 70 indicates that an odd constellation is to be demodulated, complex rotation software 84 and complex shifting software 86 as part of coefficient initialization/update block 64 modify the tap coefficients to carry out the signal sample rotation and shifting in the complex plane as set forth in Equation 3. Once filtered, the samples are applied to adder 43 where they are modified by a feedback signal generated by feed back filter software 78 to reduce the effects of ISI. Next, slicer software 72 recovers the symbol information from the samples, which is then converted into the original bit stream by demapper software 74.

Once the training session is complete and the communication of actual user data begins, receiving modem 128 operates substantially as described in the foregoing with the exception being that the tap coefficients need not be modified by complex rotation software 84 and complex shifting software 86 unless a change in modulation has occurred. The tap coefficients are adaptively updated periodically through coefficient maintenance software 88 based on error vectors generated by adder 45 and received at coefficient initialization/update block 64.

It will be appreciated by those skilled in the art that the functionality provided through training software 70, slicer software 72, demapper software 74 and feed forward/rotation software 76 can also be implemented through hardware. Each implementation has its advantages. For example, hardware enjoys a speed and, arguably, a reliability advantage over software because hardware testing and verification methods are currently more advanced than software verification methods. On the other hand, software can be less expensive than customized hardware and offers greater flexibility in adding or modifying product features.

An important advantage of the present invention is that the sample rotation and error unrotation need no longer be performed at baud rate speeds, but instead is accomplished through a one time modification of the coefficients of a standard feed forward filter during the training interval. Accordingly, the present invention achieves the benefits of demodulating odd constellations through rotation without incurring any processor real time penalty while the communication session is active. It is therefore envisioned that the principles of the instant invention as embodied in receiving modem 128 will find broad application as the demand for increased bandwidth and high speed data services continues to increase.

Those skilled in the art will recognize that sample rotator 52 and error unrotator 54 of FIG. 7 could be implemented through a FIR filter similar to feed forward filter 42 and feedback filter 47 in which their coefficients are adapted to perform the desired symbol and error rotation. Nevertheless, such an embodiment is less desirable than the present invention because of the additional filtering components and memory required.

The skilled practitioner will therefore appreciate that the odd constellation receiver 128 as embodied in FIG. 9 effectively demodulates odd constellations at efficiency levels equal to that of even constellation demodulation while minimizing any additional processor real time, filtering circuitry and memory required. In addition, the principles of the present invention have been disclosed herein as applied to a digital communication system using CAP modulation. These principles and concepts can be applied, however, to communication systems using alternative modulation schemes, such as quadrature amplitude modulation (QAM), where digital information is encoded as a constellation of symbols.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

I claim:

1. A receiving modem, comprising:

means for adaptively filtering an odd constellation of signal sample points from a modulated signal;

a storage medium;

processing means in communication with said storage medium;

said storage medium having program code for controlling said means for adaptively filtering, said program code comprising:

a first code segment for recovering said sample points from said modulated signal;

a second code segment for equalizing said sample points through multiplication of said sample points with a plurality of filter tap coefficients;

a third code segment for modifying said coefficients to rotate said sample points 45° clockwise in a complex plane, said complex plane comprising an in-phase and a quadrature axis;

a fourth code segment for modifying said coefficients to shift said sample points along said quadrature axis; and a fifth code segment for maintaining said coefficients.

2. The modem of claim 1, further comprising:

means for extracting symbols from said filtered sample points.

3. The modem of claim 1, further comprising:

means for generating a digital bit stream from said symbol information.

4. The modem of claim 1, wherein said odd constellation is generated by eliminating every other sample point from the next higher even constellation.

5. A receiving modem, comprising:

means for adaptively filtering an odd constellation of signal sample points from a modulated signal, said filtering means comprising:

means for recovering said sample points from said modulated signal;

means for equalizing said sample points through multiplication of said sample points with a plurality of filter tap coefficients;

first means for modifying said coefficients to rotate said sample points 45° clockwise in a complex plane, said complex plane comprising an in-phase and a quadrature axis; and second means for modifying said coefficients to shift said sample points along said quadrature axis;

means for extracting symbols from said filtered sample points; and means for generating a digital bit stream from said symbol information.

6. The receiving modem of claim 5, wherein said recovering, equalizing, first modifying and second modifying means are software programs residing in a storage medium and executable by a processing means.

7. A receiving modem, comprising:

a first adaptive filter for receiving a modulated signal comprising an odd constellation of signal sample points;

said first adaptive filter having associated therewith a plurality of tap coefficients, said coefficients having values assigned to equalize said sample points, to rotate said sample points 45° clockwise in a complex plane comprising an in-phase and a quadrature axis, and to shift said sample points along said quadrature axis thereby generating a first adaptive filter output signal;

a slicer receptive to said first adaptive filter output signal and extracting symbols therefrom; and a demapper generating a digital bit stream in response to said symbols extracted by said slicer.

8. The receiving modem of claim 7, further comprising:

a second adaptive filter for receiving the symbols generated by said slicer and generating a second adaptive filter output signal for combination with said first adaptive filter output signal to reduce inter-symbol interference (ISI).

9. The receiving modem of claim 7, further comprising:

an adder receptive to said first adaptive filter output signal and said symbols from said slicer and computing an error vector output signal in response thereto; said error vector output signal being coupled to said first adaptive filter for maintaining said coefficients.

10. A method for demodulating a signal modulated by an odd constellation of sample points, comprising the steps of:

providing an adaptive filter for receiving said signal, said filter having associated therewith a plurality of tap coefficients;

recovering said sample points;

modifying said coefficients to rotate said sample points 45° clockwise in a complex plane, said complex plane comprising an in-phase axis and a quadrature axis;

modifying said coefficients to shift said sample points along said quadrature axis;

equalizing said sample points through multiplication of said sample points with said coefficients;

extracting symbols from said equalized sample points;

generating a digital bit stream from said symbols.

11. The method of claim 10, wherein said odd constellation is generated by the following steps:

providing an even constellation one level higher than said odd constellation; and eliminating every other point in said even constellation.

12. The method of claim 10, wherein each said sample point comprises an in-phase component and a quadrature phase component and wherein said rotation comprises the following steps:

adding said in-phase component and said quadrature phase component for each said sample point to create a rotated in-phase component; and subtracting said in-phase component from said quadrature phase component for each said sample point to create a rotated quadrature component.

13. The method of claim 12, wherein said shifting comprises the step of:

adding an offset constant to said rotated quadrature component.

14. The method of claim 13, further comprising the step of multiplying said rotated in-phase and quadrature components by a scaling factor.

15. The method of claim 10, wherein said extracting step comprises the steps of:

calculating a neighborhood region for each said equalized sample point in said odd constellation;

for each said equalized sample point, correlating said equalized sample point with one of said neighborhood regions; and for each said equalized sample point, producing a symbol uniquely associated with said correlated neighborhood region.

16. The method of claim 15, further comprising the steps of:

for each said equalized sample point, calculating an error vector representative of the difference between said equalized sample point and a valid constellation point in said correlated neighborhood region; and adapting said tap coefficients of said adaptive filter to the noise characteristics of a communication channel with said error vectors.

17. A computer readable medium having a program for demodulating a signal modulated by an odd constellation of sample points, said program comprising:

logic configured for recovering said sample points from said modulated signal;

logic configured for equalizing said sample points through multiplication of said sample points with a plurality of filter tap coefficients;

first logic configured for modifying said coefficients to rotate said sample points 45° clockwise in a complex plane, said complex plane comprising an in-phase and a quadrature axis;

second logic configured for modifying said coefficients to shift said sample points along said quadrature axis; and logic configured for maintaining said coefficients.

18. The computer readable medium of claim 17, wherein each said sample point comprises an in-phase component and a quadrature phase component and wherein said coefficients are modified by said first modification logic to perform the steps of:

adding said in-phase component and said quadrature phase component for each said sample point to create a rotated in-phase component; and subtracting said in-phase component from said quadrature phase component for each said sample point to create a rotated quadrature component.

19. The computer readable medium of claim 18, wherein said coefficients are modified by said second modification logic to perform the step of:

adding an offset constant to said rotated quadrature component.

* * * * *